United States Patent
Olsson

(10) Patent No.: US 9,180,425 B2
(45) Date of Patent: Nov. 10, 2015

(54) REACTOR COMPRISING A ROTOR

(75) Inventor: Anders Olsson, Charlwood (GB)

(73) Assignee: Cassandra Oil Technology AB, Västerås (SE)

( * ) Notice: Subject to any disclaimer, the term of this patent is extended or adjusted under 35 U.S.C. 154(b) by 550 days.

(21) Appl. No.: 13/518,080

(22) PCT Filed: Dec. 21, 2010

(86) PCT No.: PCT/SE2010/051452
§ 371 (c)(1),
(2), (4) Date: Aug. 28, 2012

(87) PCT Pub. No.: WO2011/078779
PCT Pub. Date: Jun. 30, 2011

(65) Prior Publication Data
US 2012/0321531 A1    Dec. 20, 2012

(30) Foreign Application Priority Data

Dec. 22, 2009  (SE) ..................... 0901600

(51) Int. Cl.
| | | |
|---|---|---|
| *B01J 8/10* | (2006.01) | |
| *B02C 13/04* | (2006.01) | |
| *B01J 19/18* | (2006.01) | |
| *B01F 7/00* | (2006.01) | |
| *B01F 7/04* | (2006.01) | |

(52) U.S. Cl.
CPC ......... *B01J 19/1806* (2013.01); *B01F 7/00075* (2013.01); *B01F 7/04* (2013.01); *B01J 8/10* (2013.01); *B02C 13/04* (2013.01)

(58) Field of Classification Search
CPC .............. B01J 8/10; B01J 19/18; B02C 13/04
USPC ......................................................... 422/225
See application file for complete search history.

(56) References Cited

U.S. PATENT DOCUMENTS 3,279,895 A   1/1964  Howe
3,277,667 A * 10/1966  Hedrick .......................... 62/343
(Continued)

FOREIGN PATENT DOCUMENTS

GB   1 502 166   2/1978
JP   48-42628   12/1973
(Continued)

OTHER PUBLICATIONS

Notice of Reasons for Refusal (Office Action) with English Translation, Japanese Patent Application No. 2012-5459004, dated Jun. 10, 2014.
(Continued)

*Primary Examiner* — Walter D Griffin
*Assistant Examiner* — Huy-Tram Nguyen
(74) *Attorney, Agent, or Firm* — Morgan, Lewis & Bockius LLP

(57) ABSTRACT

The present invention relates to a reactor for the separation of material included in composite raw material, which reactor comprises at least one reaction chamber and at least one rotor, said reaction chamber comprising at least one housing that is sealed in relation to the surroundings and has at least one inlet opening and at least one outlet opening, and said rotor comprising at least one shaft. At least a first part of said rotor is situated in said housing, and said shaft extends in only one direction from said first part through and out of said housing.

17 Claims, 4 Drawing Sheets

(56) References Cited

U.S. PATENT DOCUMENTS

| | | | |
|---|---|---|---|
| 3,538,067 A | 11/1970 | Bognar | |
| 3,946,950 A | 3/1976 | Graf | |
| 4,205,919 A * | 6/1980 | Attwell | 366/34 |
| 5,609,835 A | 3/1997 | Pitcher | |
| 5,722,607 A * | 3/1998 | Hellmich | 241/189.1 |
| 6,165,349 A * | 12/2000 | Madar | 208/55 |
| 2001/0006611 A1 * | 7/2001 | Koski et al. | 422/225 |
| 2002/0193558 A1 | 12/2002 | Hinokimori et al. | |
| 2005/0287670 A1 * | 12/2005 | Gulliver et al. | 435/455 |
| 2009/0295244 A1 * | 12/2009 | Ries | 310/90.5 |

FOREIGN PATENT DOCUMENTS

| | | |
|---|---|---|
| JP | 50-156061 | 12/1975 |
| JP | 51-108281 | 8/1976 |
| JP | 59-147628 | 8/1984 |
| JP | 62-126230 | 8/1987 |
| JP | 7-509399 | 10/1995 |
| JP | 2001-219054 | 8/2001 |
| JP | 2001-514680 | 9/2001 |
| JP | 2002-239360 | 8/2002 |
| JP | 2003-246879 | 9/2003 |
| JP | 2006-111819 | 4/2006 |
| JP | 2008-221043 | 9/2008 |
| RU | 2013687 | 5/1994 |
| SU | 439304 | 1/1975 |
| WO | WO 94/02241 | 2/1994 |
| WO | WO 98/39368 | 9/1998 |

OTHER PUBLICATIONS

International Search Report for PCT/SE2010/051452 dated May 6, 2011.

* cited by examiner

REACTOR COMPRISING A ROTOR

RELATED APPLICATIONS

The present application is a U.S. National Phase Application of International Application No. PCT/SE2010/051452 (filed 21 Dec. 2010) which claims priority to Swedish Application No. 0901600-7 (filed 22 Dec. 2009).

The present invention relates to a reactor for the separation of material included in composite raw material, which reactor comprises at least one reaction chamber and at least one rotor, said reaction chamber comprising at least one housing that is sealed in relation to the surroundings and has at least one inlet opening and at least one outlet opening, and said rotor comprising at least one shaft.

PRIOR ART

U.S. Pat. No. 6,165,349 discloses a reactor comprising a reaction chamber having a rotation mechanism that consists of a shaft to which vanes are symmetrically attached by means of driving discs. The shaft is carried in bearings in both ends of the reaction chamber. An extensive dismounting work is required to release the vanes for service and possible replacement.

SUMMARY OF THE INVENTION

A first object of the present invention is to provide a reactor that, with a minimum of dismounting work, allows access to the rotor including occurring vanes for service and/or replacement. A second object of the present invention is to provide a reactor that, with a minimum of dismounting work, allows access to occurring wear surfaces in the reaction chamber/housing for service and/or replacement. Thus, the invention embraces a reactor for the separation of material included in composite raw material, which reactor comprises at least one reaction chamber and at least one rotor, said reaction chamber comprising at least one housing that is sealed in relation to the surroundings and has at least one inlet opening and at least one outlet opening, and said rotor comprising at least one shaft, wherein at least a first part of said rotor is situated in said housing, and that said housing has at least one dismountable part and that said shaft extends in only one direction from said first part through and out of said housing.

At least one support device may act together on a part of said shaft situated outside said housing, alternatively on an additional shaft joined to this part, said support device entirely supporting the reactor. At least one support device may act together on a part of said shaft situated outside said housing, alternatively on an additional shaft joined to this part, said support device partly supporting the reactor. Said shaft may be carried in bearings in at least two planes that extend primarily perpendicular to a principal direction of extension of said shaft, and where said planes are situated outside said jacket. Said support device may comprise at least one stand. Said support device may comprise at least two bearings for the bearing mounting of said shaft in said planes. Said support device may comprise at least one bearing housing.

Said housing may have a primarily cylindrical shape. Said dismountable part in said housing may be attached to a remainder of said housing by screw joints and/or bolt joints. Said dismountable part may be internally provided with wear-resistant material. Said housing may be sealed in such a way that exchange of gas between said reaction chamber and the surroundings is primarily prevented.

The remainder of said housing may be attached to at least one of said at least one bearing housing and be supported entirely by this/these. The remainder of said housing may be attached to at least one of said at least one bearing housing and be supported partly by this/these. The remainder of said housing may be attached to at least one of said at least two bearings and be supported entirely by this/these. The remainder of said housing may be attached to at least one of said at least two bearings and be supported partly by this/these. The remainder of said housing may be attached to at least one of said at least one stand and be supported entirely by this/these. The remainder of said housing may be attached to at least one of said at least one stand and be supported partly by this/these.

Said first part of said rotor may comprise at least one hammer. At least one of said hammers may comprise at least one fixed part and at least one articulated part. Said fixed part may be fixedly attached to said first part of said rotor and said articulated part may be articulately attached to said fixed part. Said articulated part may have a centre of gravity lying on a first radius of said rotor at the same time as an axis of rotation for rotation between said articulated part and said fixed part is lying on a second radius of said rotor, said first radius trailing said second radius upon rotation of said rotor in connection with operation of the reactor. Upon rotation of said rotor in connection with operation of the reactor, for each hammer in the direction of rotation, there may arise a force F2 that is proportional to

- a mass m of said articulated part of the hammer,
- a perpendicular distance $l1$ between said first radius and said axis of rotation, and
- a speed of rotation $v1$ squared of said centre of gravity, as well as inversely proportional to
- an effective length $l2$ of the hammer, and
- a radius $r1$ from the centre of said rotor to said centre of gravity.

LIST OF FIGURES

DESCRIPTION OF EMBODIMENTS

Figure 1:
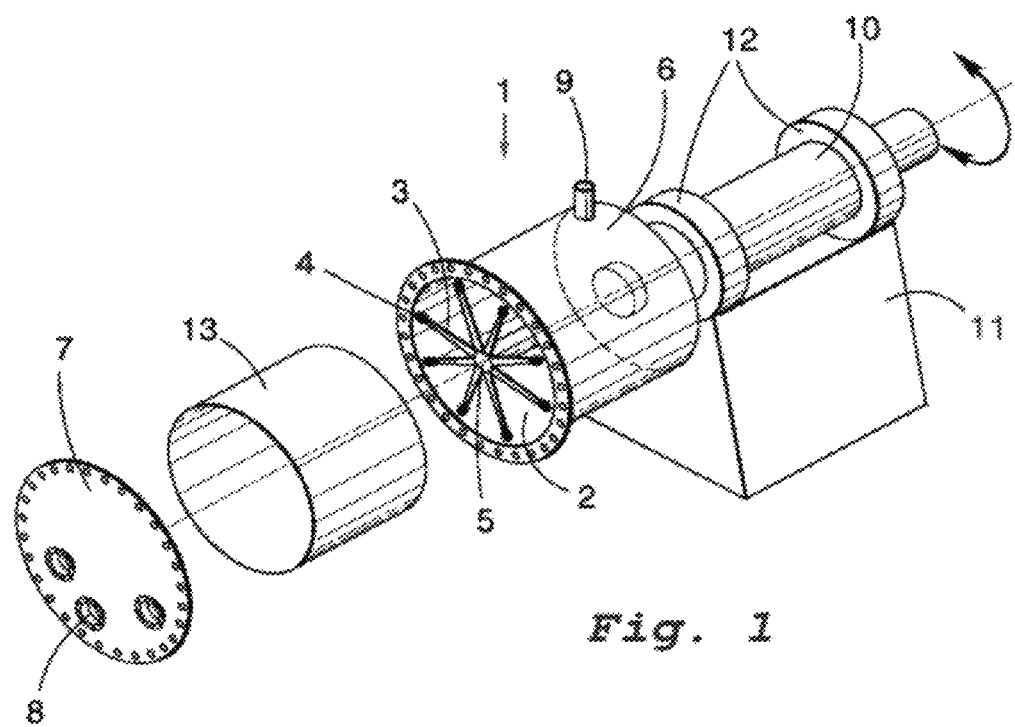
FIG. 1 shows, in an exploded perspective view, a first embodiment of a reactor according to the invention.

In FIG. 1, it is seen how a reactor according to the invention of a first embodiment looks. The reactor 1 comprises a reaction chamber 2 and a rotor 3 that is located at least partly in the same and has hammers 4 mounted on a rotor shaft 5. The reaction chamber 2 is surrounded by a housing 6 comprising a lid 7 in a first end, the lid 7 having one or more inlet openings 8 for raw material to the reactor and the rest of the housing 6 having one or more outlet openings 9 for products from the reactor. The housing 6 is primarily cylindrical, the lid 7 being primarily circular and the lid 7 as well as the rest of the housing 6 being provided with a mating circumferential flange having a first diameter for a common bolt joint.

In an analogous way, in a second end, the housing 6 connects to a bearing housing 10, the housing 6 as well as the bearing housing 10 being provided with a mating circumferential flange having a second diameter for a common bolt joint. The first diameter is greater than the second diameter. The bearing housing 10 is in turn supported by a stand 11 and accommodates two bearings 12 for the bearing mounting of the rotor shaft 5 where the same extends outside the reaction chamber 2, i.e., only on one side of the reaction chamber 2, the stand 11 accordingly supporting the entire reactor 1. In the housing 6, there is also a primarily cylindrical insert 13 of a wear-resistant material such as steel or ceramic material, which insert 13 is easily replaceable. In the housing 6, there is also an inner wall (not shown) that allows gas to pass through the centre of said wall into an inner/rear space (not shown) in the reaction chamber 2, from where the gas can continue out of the reactor through one of the mentioned outlet openings 9 and further to a possible distillation unit (not shown), or a condensation unit (not shown), or directly for combustion in an engine (not shown) or a heating system (not shown).

The reaction chamber 2 is, apart from occurring inlet openings 8 and outlet openings 9, separated from the surroundings, i.e., the housing 6 with the lid 7 and occurring connection to said bearing housing 10 comprising occurring seal at shaft bushing of the rotor shaft 5 are in other respects to be considered as primarily gas-tight in relation to the surroundings. In this way, the reaction chamber 2 and the reactor 1 differ from usual hammer mills, which are more or less open toward the surroundings. The lid 7 can easily be dismounted when it is desired to check the state of the insert 13 and/or replace it, and/or when it is desired to check the state of the rotor 3 including the hammers 4.

Figure 2:
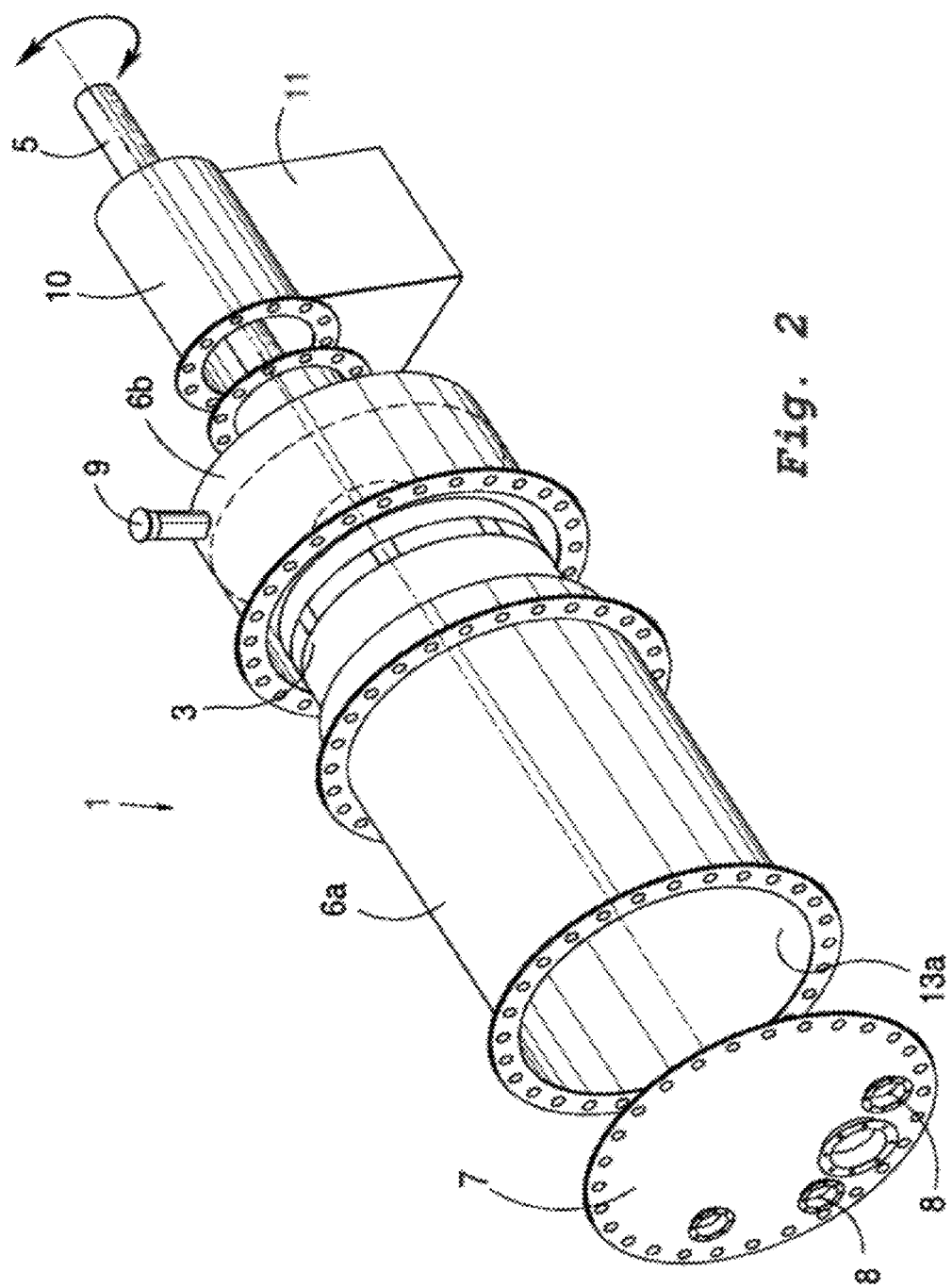
FIG. 2 shows, in an exploded perspective view, a second embodiment of a reactor according to the invention.
Figure 3:
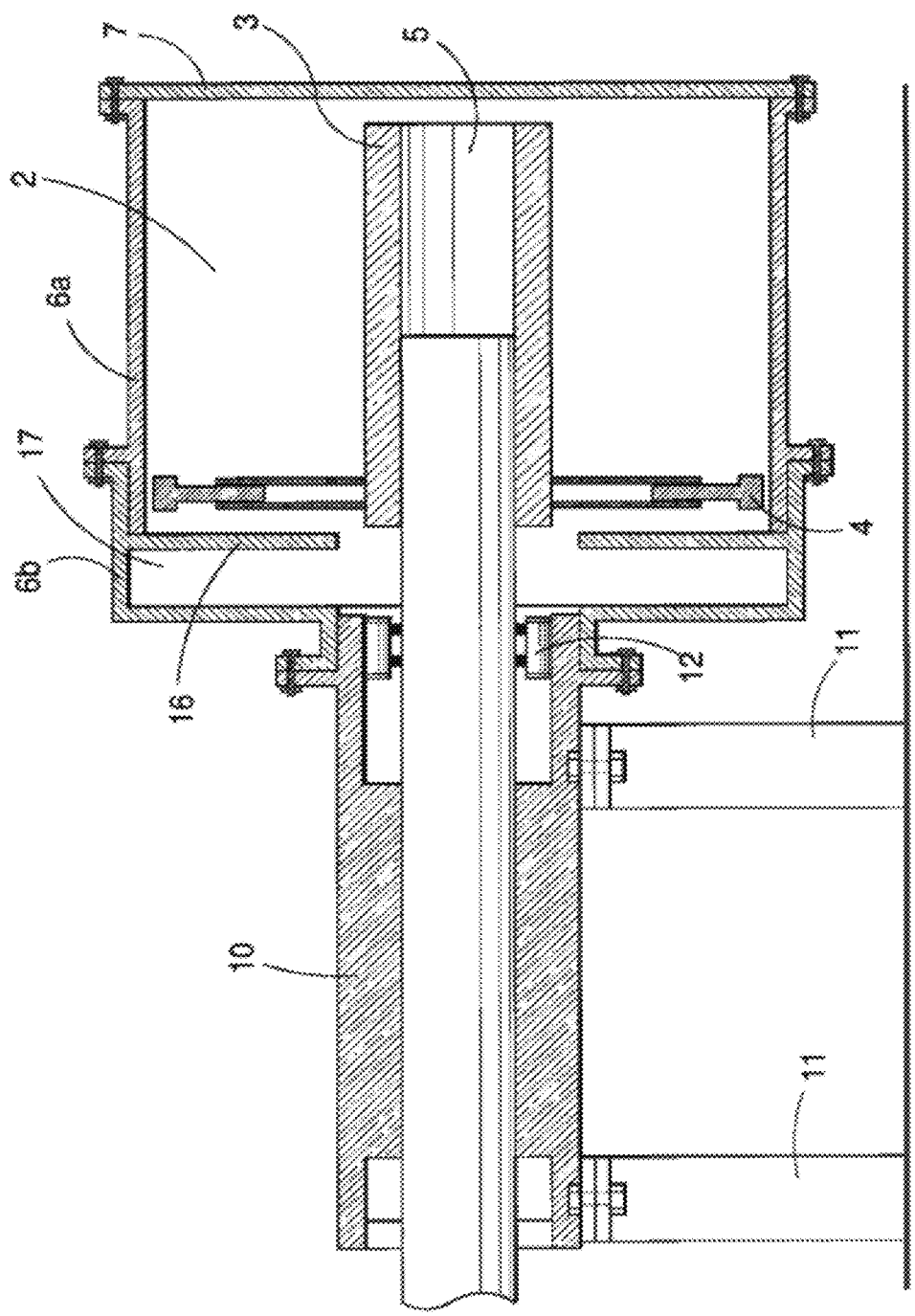
FIG. 3 shows, in a partly sectioned side view, the reactor in FIG. 2.
Figure 4:
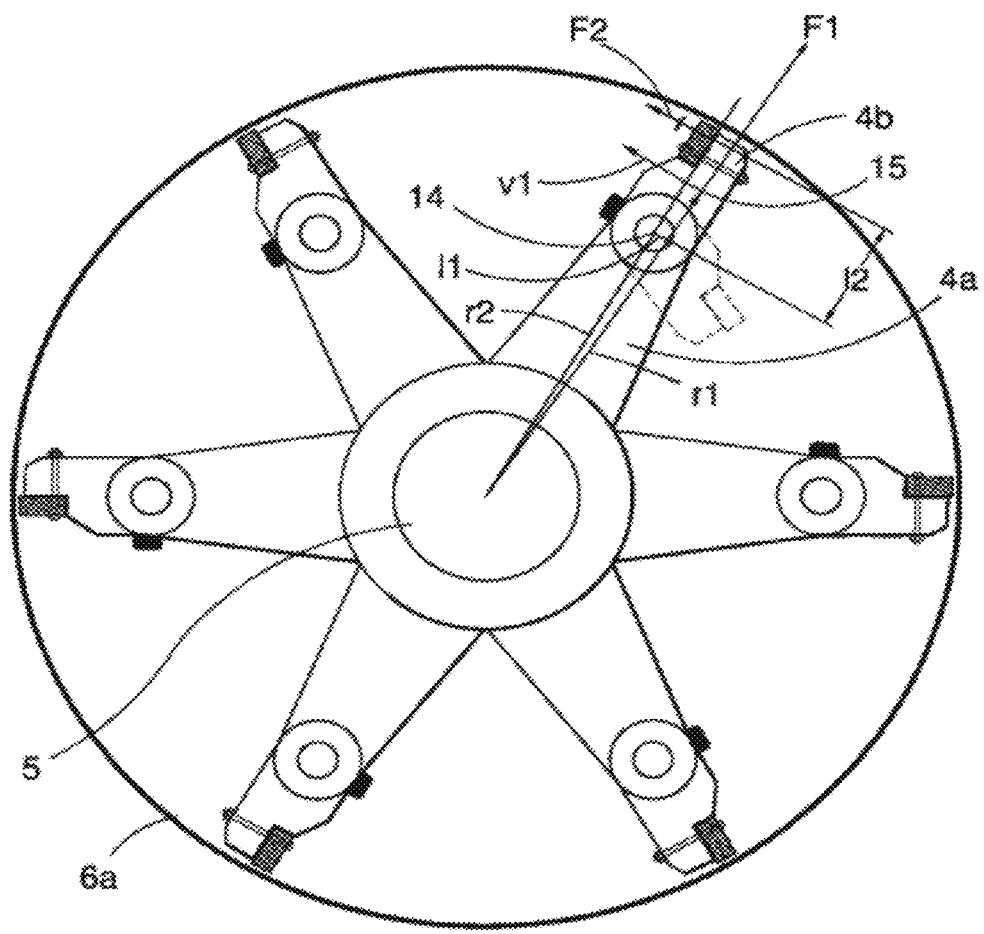
FIG. 4 shows, in a partly sectioned front view, a housing and a rotor included in the reactor in FIG. 2.

In FIGS. 2-4, it is seen how a reactor according to the invention in a second embodiment looks. The foremost differences compared to the first embodiment are that the housing is divided into further parts, viz. a first easily removable part 6a—still provided with a lid 7—and a second remaining part 6b, as well as the fact that a covering 13a of a wear-resistant material now is present on the inside of the first part 6a and that accordingly the insert 13 can be spared. The first part 6a as well as the second part 6b is provided with a mating circumferential flange of the first diameter for a common bolt joint. The first part 6a can easily be dismounted when it is desired to check the state of the covering 13a and/or replace it, and/or when it is desired to check the state of the rotor 3 including the hammers 4 (only two are drawn in FIG. 3), and/or do service on them and/or replace them. In this simple way, a great part of the rotor 3 is easily accessible. The lid 7 can, as previously, easily be dismounted per se, but can also remain on the first part 6a when this is being dismounted. In the housing 6, there is, as previously, also an inner wall 16 that allows gas to pass through the centre of said wall 16 into an inner/rear space 17 in the reaction chamber 2, from where the gas can continue out of the reactor through one of the mentioned outlet openings 9.

In FIG. 4, it is seen how the rotor 3 looks. The rotor shaft 5 is provided with six hammers 4, each hammer 4 consisting of a fixed part 4a and an articulated part 4b. The articulated part 4b is pivoted around an axis 14 that extends primarily parallel to the principal direction of extension of the rotor shaft 5. When the rotor 3 rotates—anti-clockwise in the figure—the articulated part 4b has a centre of gravity 15 that is lying on a first radius r1 of said rotor at the same time as the axis 14 for rotation between the articulated part 4b and the fixed part 4a is lying on a second radius r2 of said rotor, said first radius r1 trailing said second radius r2 in the rotation, i.e., said first radius r1 forming an angle with said second radius r2. For each hammer, then a force F2 arises in the direction of rotation that is proportional to a mass m of said articulated part 4b of the hammer,
a perpendicular distance l1 between said first radius r1 and said axis of rotation 14, and
a speed of rotation v1 squared of said centre of gravity 15, as well as inversely proportional to
an effective length l2 of the hammer, and
a radius r1 from the centre of said rotor to said centre of gravity 15.

By the effective length l2 of the hammer, reference is made to a perpendicular distance between the force F2 and said axis of rotation 14. The force F2 attacks in the central point (the centre of mass) of the material accumulated on the hammer and which the force F2 should work against.

Thus, a desired power per hammer can be calculated and set by predetermining the parameters listed above. Occurring torque will hold each hammer in the predetermined place—against a stop for each hammer (not shown)—by the determined force F2, and if it is exceeded because of too much material being fed into the reactor or because of some heavier impurity having entered into the reactor, the articulated part 4b bends rearward and lets the material pass until equilibrium of forces arises again. This function provides a levelling effect during normal operation and protection against breakdown if, for instance, foreign items would accompany the material to be processed.

In use of the reactor, raw material is brought in through one or more of occurring inlet openings 8 into the reaction chamber 2 where it is decomposed by the kinetic energy of the hammers 4 of the rotor, as well as by the kinetic energy of particles that are thrown around by the rotary motion of the rotor, and by the heat energy that is created by friction between the hammers 4 and parts of the raw material. Inorganic material in the form of sand, catalysts, steel, glass, etc., may be used to increase the friction and thereby the temperature. The inorganic particles affect the decomposition process favourable by the fact that they have a large total contact surface that acts as an efficient heat exchanger against the raw material, as well as a catalyst for the breaking of hydrocarbon polymers and greater hydrocarbon molecules. Hydrocarbon compounds, water and other organic material are gasified in the device. The centrifugal forces created by the rotor separate the gas from the heavier inorganic materials, the gas part being brought out of the reactor in the centre thereof and the heavier particles can be tapped at the periphery of the reactor, and in both cases through occurring outlet openings 9.

The invention is not limited to the embodiments shown herein, but may be varied within the scope of the subsequent claims.

The invention claimed is:

1. Reactor for the separation of material included in composite raw material, which reactor comprises at least one reaction chamber and at least one rotor, said reaction chamber comprising at least one housing that is sealed in relation to the surroundings and has at least one inlet opening and at least one outlet opening, and said rotor comprising at least one shaft,
   wherein at least a first part of said rotor is situated in said housing, and said housing has at least one dismountable part, and said shaft extends in only one direction from only one surface of said first part of said rotor through and out only one surface of said housing, and
   wherein at least one support device together acts on a part of said shaft situated outside said housing, alternatively on an additional shaft joined to this part, said support device entirely supporting the reactor.

2. Reactor according to claim 1, wherein said shaft is mounted in bearings in at least two planes that extend primarily perpendicular to a principal direction of extension of said shaft, and where said planes are situated outside said housing.

3. Reactor according to claim 1, wherein said support device comprises at least one stand.

4. Reactor according to claim 1, wherein said shaft is mounted in bearings in at least two planes that extend primarily perpendicular to a principal direction of extension of said shaft, and where said planes are situated outside said housing, and wherein said support device comprises at least two bearings for the bearing mounting of said shaft in said planes.

5. Reactor according to claim 1, wherein said support device comprises at least one bearing housing.

6. Reactor according to claim 1, wherein said housing has a primarily cylindrical shape.

7. Reactor according to claim 1, wherein said dismountable part is attached to a remainder of said housing by screw joints and/or bolt joints.

8. Reactor according to claim 7, wherein said dismountable part is internally provided with wear-resistant material.

9. Reactor according claim 1, wherein said housing is sealed in such a way that exchange of gas between said reaction chamber and the surroundings is primarily prevented.

10. Reactor according to claim 7, wherein the remainder of said housing is attached to at least one bearing housing and is supported entirely by the at least one bearing housing.

11. Reactor according to claim 7, wherein the remainder of said housing is attached to at least two bearings and is supported entirely by the at least two bearings.

12. Reactor according to claim 7, wherein the remainder of said housing is attached to at least one stand and is supported entirely by the at least one stand.

13. Reactor according to claim 1, wherein said first part of said rotor comprises at least one hammer.

14. Reactor according to claim 13, wherein at least one of said hammers comprises at least one fixed part and at least one articulated part.

15. Reactor according to claim 14, wherein said fixed part is fixedly attached to said first part of said rotor and said articulated part is articulately attached to said fixed part.

16. Reactor according to claim 15, wherein said articulated part has a centre of gravity lying on a first radius of said rotor at the same time as an axis of rotation for rotation between said articulated part and said fixed part is lying on a second radius of said rotor, said first radius trailing said second radius upon rotation of said rotor in connection with operation of the reactor.

17. Reactor according to claim 16, wherein upon rotation of said rotor in connection with operation of the reactor, for each hammer in the direction of rotation, there arises a force that is proportional to
- a mass of said articulated part of the hammer,
- a perpendicular distance between said first radius and said axis of rotation, and
- a speed of rotation squared of said centre of gravity, as well as inversely proportional to
- an effective length of the hammer, and
- a radius from the centre of said rotor to said centre of gravity.

* * * * *